US009230164B2

(12) United States Patent
Naito

(10) Patent No.: US 9,230,164 B2
(45) Date of Patent: Jan. 5, 2016

(54) COMMODITY RECOGNITION APPARATUS AND CONTROL METHOD THEREOF

(71) Applicant: TOSHIBA TEC KABUSHIKI KAISHA, Shinagawa-ku, Tokyo (JP)

(72) Inventor: Hidehiro Naito, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/454,061

(22) Filed: Aug. 7, 2014

(65) Prior Publication Data

US 2015/0062415 A1 Mar. 5, 2015

(30) Foreign Application Priority Data

Aug. 30, 2013 (JP) ................. 2013-180745

(51) Int. Cl.
*G06K 9/00* (2006.01)
*H04N 5/225* (2006.01)
*H04N 5/235* (2006.01)

(52) U.S. Cl.
CPC .......... *G06K 9/00536* (2013.01); *H04N 5/2256* (2013.01); *H04N 5/2354* (2013.01)

(58) Field of Classification Search
CPC .. H04N 5/2256; H04N 5/2354; H04N 5/2353
USPC ................................. 348/370, 371
See application file for complete search history.

(56) References Cited

U.S. PATENT DOCUMENTS

| 4,297,011 | A | 10/1981 | Adams, Jr. |
| 5,992,746 | A | 11/1999 | Suzuki |
| 6,394,349 | B1 | 5/2002 | Shigekusa et al. |
| 2011/0310270 | A1* | 12/2011 | Gladnick ........... G01N 21/8806 348/229.1 |
| 2011/0317029 | A1* | 12/2011 | Fukui ................... H04N 5/2354 348/224.1 |
| 2012/0217302 | A1 | 8/2012 | Naito et al. |

FOREIGN PATENT DOCUMENTS

| JP | 07-93462 | 4/1995 |
| JP | 11-120284 | 4/1999 |
| JP | 2004-127215 | 4/2004 |

(Continued)

OTHER PUBLICATIONS

First Office Action for Japanese Patent Application No. 2013-180745 dated Jul. 14, 2015, 6 pages.

*Primary Examiner* — Tuan Ho
(74) *Attorney, Agent, or Firm* — Amin, Turocy & Watson, LLP

(57) ABSTRACT

A commodity recognition apparatus comprises an image capturing unit for capturing image of a commodity in an image capturing area, a first unit for illuminating a first illumination area closer to the image capturing unit within the image capturing area according to an exposure period of the image capturing unit, a second unit for illuminating a second illumination area including part of the first illumination area and an area further than the first illumination area from the image capturing unit within the image capturing area for an illumination period according to the exposure period, and a control module for controlling, if overexposure of the image is detected, an execution timing of the second unit so that a shifting amount of the illumination period of the second unit to an exposure period next to the exposure period in which the overexposure is detected is different from a predetermined reference value.

7 Claims, 4 Drawing Sheets

(56) References Cited

FOREIGN PATENT DOCUMENTS

| | | |
|---|---|---|
| JP | 2008-243051 | 10/2008 |
| JP | 2010-198137 | 9/2010 |
| JP | 2011-059973 | 3/2011 |
| JP | 2011-259375 | 12/2011 |
| JP | 2012-074025 | 4/2012 |

* cited by examiner

COMMODITY RECOGNITION APPARATUS AND CONTROL METHOD THEREOF

CROSS-REFERENCE TO RELATED APPLICATION

This application is based upon and claims the benefit of priority from Japanese Patent Application No. 2013-180745, filed Aug. 30, 2013, the entire contents of which are incorporated herein by reference.

FIELD

Embodiments described herein relate to a commodity recognition apparatus and a control method thereof.

BACKGROUND

There is known a commodity recognition apparatus which recognizes a commodity, through an object recognition for the commodity or by extracting and analyzing a code-symbol, e.g., a barcode, from an image captured by photographing the commodity through an image capturing unit using a CCD (charge coupled device) and the like.

In such types of commodity recognition apparatus, it is general to illuminate the commodity held in front of the image capturing unit by an operator with light emitted by a light emission device arranged nearby the image capturing unit.

To cope with the variation in the position of the commodity held by the operator, a first illumination unit for illuminating an area nearby the image capturing unit and a second illumination unit for illuminating an area further than the area mentioned are respectively arranged in the commodity recognition apparatus. With such a constitution, it is easy to achieve brightness suitable for photographing both the commodity held close to the image capturing unit and the commodity held far away from the image capturing unit with the image capturing unit.

However, intensity of light emitted from the second illumination unit is generally greater than that from the first illumination unit. If the commodity held close to the image capturing unit is illuminated by the second illumination unit, overexposure may occur in the image obtained by the image capturing unit, and in this case, there is a possibility that the commodity cannot be recognized correctly.

Thus, it is desired that the commodity can be recognized correctly even if the commodity held close to the image capturing unit is illuminated by the second illumination unit.

DETAILED DESCRIPTION

In accordance with one embodiment, a commodity recognition apparatus comprises an image capturing unit, a recognition module, a first illumination unit, a second illumination unit, a detection module and a control module.

The image capturing unit repeatedly photographs a commodity located in an image capturing area which is illuminated for an illumination period every predetermined exposure period to capture image of the commodity. The recognition module recognizes the commodity based on the image of the commodity captured by the image capturing unit. The first illumination unit illuminates a first illumination area closer to the image capturing unit within the image capturing area for the illumination period in relation to the exposure period. The second illumination unit illuminates a second illumination area including at least part of the first illumination area and an area further than the first illumination area from the image capturing unit within the image capturing area for a given illumination period in relation to the exposure period. The detection module detects occurrence of overexposure in the image captured by the image capturing unit. The control module controls, if the detection module detects occurrence of overexposure of the image, an execution timing of illumination of the second illumination unit so that a shifting amount of the given illumination period of the second illumination unit to a successive exposure period next to the exposure period in which the overexposure is detected is different from a predetermined reference value.

Hereinafter, an example of the embodiment is described with reference to the accompanying drawings.

Figure 1:
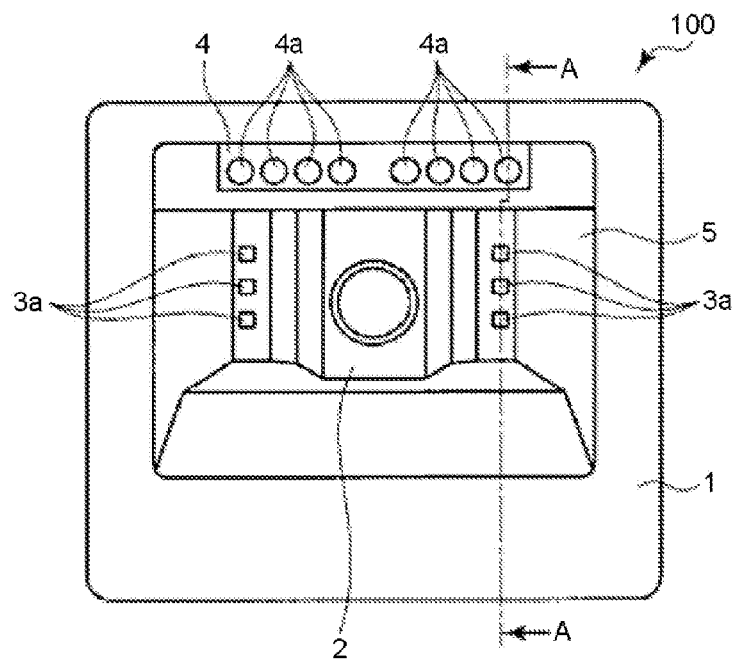
FIG. 1 is a front view illustrating the appearance of a commodity recognition apparatus according to one embodiment.

FIG. 1 is a front view illustrating the appearance of a commodity recognition apparatus 100 according to the present embodiment.

Figure 2:
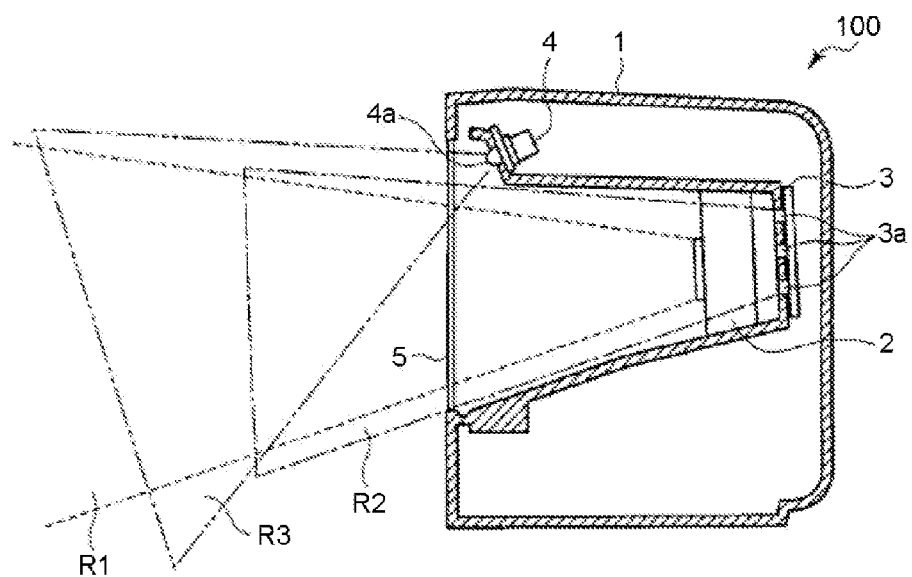
FIG. 2 is a cross-sectional view taken in the direction of the arrows A-A along the dot and dashed line in FIG. 1.

FIG. 2 is a cross-sectional view taken in the direction of arrows A-A along the dot and dashed line in FIG. 1.

The commodity recognition apparatus 100 is constituted by a housing 1 in which an image capturing unit 2, a first illumination unit 3 and a second illumination unit 4 are arranged. In FIG. 2, only the housing 1 is broken to show the inside thereof. Further, only the components necessary in the present embodiment are shown in FIG. 1 and FIG. 2, components other than the above are not shown.

The image capturing unit 2 includes an image capturing device 2a (shown in FIG. 3) such as a COD arranged inside thereof. The image capturing unit 2 photographs, through a reading window 5 formed by arranging a transparent glass or acrylic plate and the like at an opening on the housing 1, a commodity held in front of the reading window 5 (left side in FIG. 2) by an operator. An image capturing area of the image capturing unit 2 is an area R1 between two dashed lines shown in FIG. 2.

The first illumination unit 3 includes a plurality of light emission devices 3a (six in the present embodiment). For example, a well-known device such as an LED (light emitting diode) and the like can be used as the light emission device 3a. Each of the light emission devices 3a emits light towards the outside of the housing 1 through the reading window 5. In this way, the first illumination unit 3 illuminates an area R2 indicated by dot and dashed lines shown in FIG. 2. The emission intensity of the light emission device 3a is set to a brightness level suitable for photographing a commodity in an area outside and nearby the reading window 5 through the image capturing element of the image capturing unit 2.

The second illumination unit 4 includes a plurality of light emission devices 4a (eight in the present embodiment). For example, a well-known device such as an LED and the like can be used as the light emission devices 4a. Each of the light emission devices 4a emits light towards the outside of the housing 1 through the reading window 5. In this way, the second illumination unit 4 illuminates an area R3 indicated by two-dot chain line shown in FIG. 2. The emission intensity of the light emission device 4a is set to a brightness level suitable for photographing a commodity in an area outside and far away from the reading window 5 by the image capturing element of the image capturing unit 2.

In this way, the first illumination unit 3 mainly illuminates an area nearby the commodity recognition apparatus 100. The second illumination unit 4 mainly illuminates an extended area in comparison with that illuminated by the first illumination unit 3. Thus, in the following description, the illumination by the first illumination unit 3 is referred to as a short-range illumination, and the illumination by the second illumination unit 4 is referred to as a long-range illumination.

Figure 3:
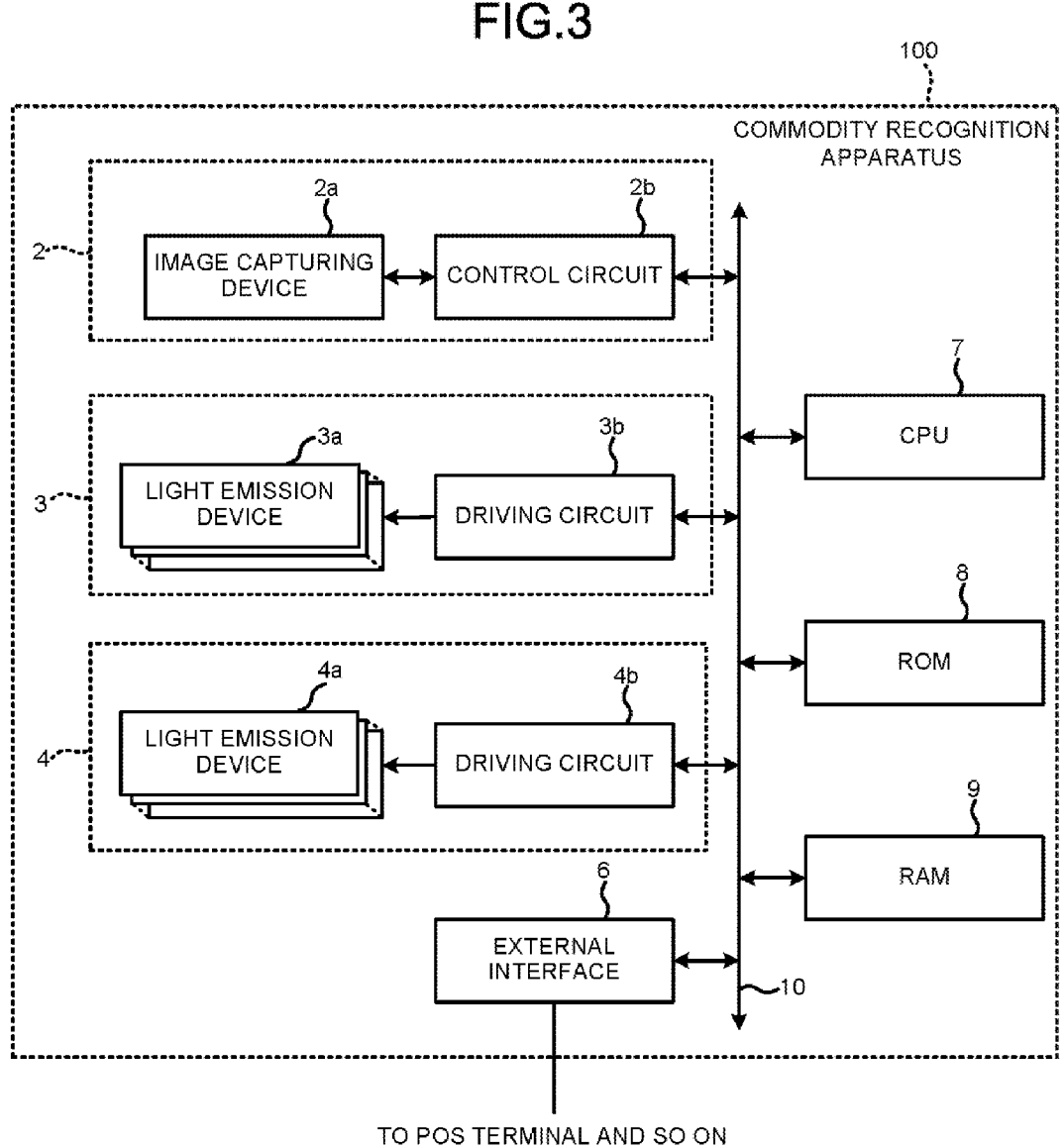
FIG. 3 is a block diagram illustrating the electrical constitution of the commodity recognition apparatus shown in FIG. 1 and FIG. 2.

FIG. 3 is a block diagram illustrating the electrical constitution of the commodity recognition apparatus 100. In FIG. 3, the same components as those shown in FIG. 1 and FIG. 2 are applied with the same reference numerals.

The commodity recognition apparatus 100 further comprises an external interface 6, a CPU (central processing unit) 7, a ROM (read-only memory) 8, a RAM (random-access memory) 9 and a bus line 10 as the electrical components in addition to the image capturing unit 2, the first illumination unit 3 and the second illumination unit 4. The bus line 10 including an address bus, a data bus and the like, connects the image capturing unit 2, the first illumination unit 3, the second illumination unit 4, the external interface 6, the CPU 7, the ROM 8 and the RAM 9 with each other.

The image capturing unit 2 further includes a control circuit 2b in addition to the image capturing device 2a described above. The control circuit 2b intermittently drives the image capturing device 2a to obtain frame data at a predetermined frame rate. The control circuit 2b writes the frame data acquired by the image capturing device 2a in the RAM 9. The control circuit 2b notifies the CPU 7 of the start and the end of the exposure by the image capturing device 2a for acquiring the frame data.

The first illumination unit 3 further includes a driving circuit 3b in addition to the plurality of light emission devices 3a. The driving circuit 3b drives the light emission devices 3a to intermittently carry out the short-range illumination under the control of the CPU 7.

The second illumination unit 4 further includes a driving circuit 4b in addition to the plurality of light emission devices 4a. The driving circuit 4b drives the light emission devices 4a to intermittently carry out the long-range illumination under the control of the CPU 7.

The external interface 6 is connected with an external device, for example, a POS terminal through a communication cable. The external interface 6 mediates the transfer of various kinds of information between the CPU 7 and the external device.

The CPU 7 is a central part of a computer. The CPU 7 controls each component of the commodity recognition apparatus 100 to realize various operations of the commodity recognition apparatus 100 according to an operating system, middleware and application programs stored in the ROM 8 and the RAM 9.

The ROM 8 is a main storage part of the computer. The ROM 8 stores the operating system. As occasion demands, the ROM 8 also stores the middleware and the application programs mentioned above, and data referred to when the CPU 7 carries out various processing.

The RAM 9 is also a main storage part of the computer mentioned above. The RAM 9 stores data referred to when the CPU 7 carries out various processing. Further, the RAM 9 is also used as a so-called work area for storing data temporarily used when the CPU 7 carries out various processing.

The application programs stored in the ROM 8 include a control program relating to a control processing described later. The transfer of the commodity recognition apparatus 100 is generally carried out in a state in which the control program is stored in the ROM 8. Alternatively, an auxiliary storage device such as an EEPROM (electric erasable programmable read-only memory), a hard disk drive or an SSD (solid state drive) is arranged in the commodity recognition apparatus 100, and the commodity recognition apparatus 100 may be transferred in a state in which the control program is stored in the auxiliary storage device. Still alternatively, the commodity recognition apparatus 100 can be transferred in a state in which the control program is not stored in the ROM 8 or the auxiliary storage device. In this case, the control program is transferred in a state in which it is recorded in a removable recording medium such as a magnetic disc, a magnetic optical disk, an optical disk, a semiconductor memory and the like, or transferred through a network, and then the control program is written in the auxiliary storage device of the commodity recognition apparatus 100 transferred separately as described above.

All or part of the later-described functions realized by the CPU 7 by executing the control processing according to the control program may be realized through a hardware such as a logic circuit and the like. Further, the functions mentioned above may also be realized through a combination of hardware and software control.

Next, the operations of the commodity recognition apparatus 100 are described.

A processing for recognizing the commodity held in front of the reading window 5 based on the frame data acquired by the image capturing device 2a may be the same as that carried out by an existing device of the same type. The recognition processing is executed by, for example, the CPU 7. Thus, the CPU 7 functions as a recognition module. The description of the recognition processing is omitted herein. A well known commodity recognition processing method may be a method of the code-symbol, for example, a barcode, recognition or a method of the object, for example, a commodity, recognition, and the present embodiment can be applied to a case where either of the methods is adopted.

When the power of the commodity recognition apparatus 100 is turned on, the CPU 7 starts the control processing based on the control program stored in the ROM 8.

Figure 4:
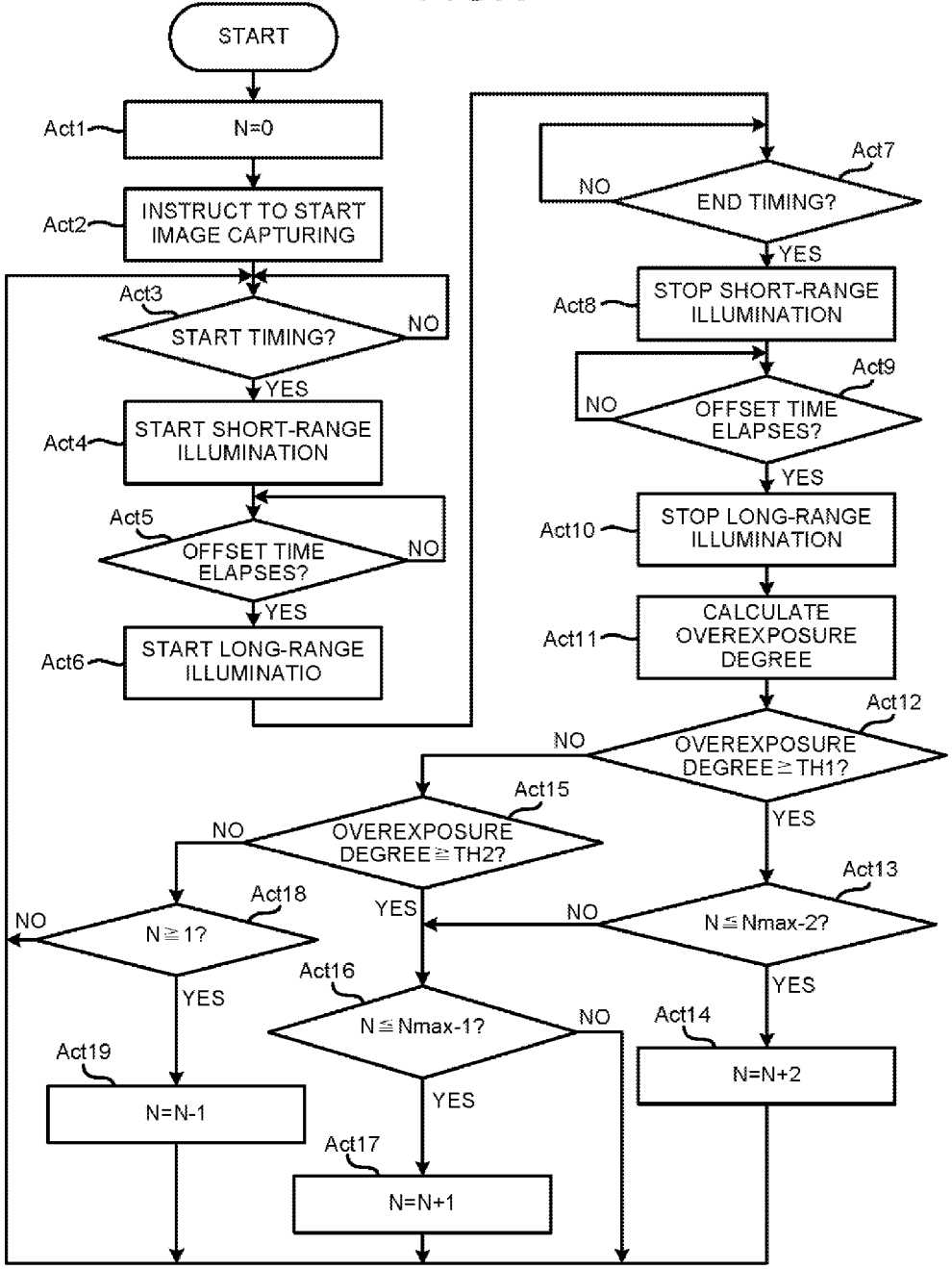
FIG. 4 is a flowchart illustrating a control processing.

FIG. 4 is a flowchart illustrating the control processing. 100 is turned on, the CPU 7 starts the control processing according to the control program stored in the ROM 8. The content of the processing is only described as an example, and thus the same result can be obtained through various processing properly.

In ACT 1, the CPU 7 sets a variable N to 0 (zero). The variable N represents a coefficient for determining an offset time of the execution timing of the long-range illumination and the exposure by the image capturing device 2a.

In ACT 2, the CPU 7 instructs the control circuit 2b to start an image capturing operation. The control circuit 2b receiving the instruction starts to intermittently drive the image capturing device 2a to acquire the frame data at the predetermined frame rate.

In ACT 3, the CPU 7 confirms whether or not the exposure of the image capturing device 2a becomes its start timing. Such a confirmation can be realized by confirming whether or not there is a start notification from the control circuit 2b. Alternatively, the confirmation can be carried out according to a timer the operation of which is synchronized with the driving of the image capturing device 2a by the control circuit 2b. If the CPU 7 determines that it is not the start timing, NO is taken and the processing in ACT 3 is repeated. The CPU 7 waits for until it becomes the start timing in ACT 3. On the contrary, if the CPU 7 determines that it is the start timing, YES is taken and thus ACT 4 is executed.

In ACT 4, the CPU 7 starts the short-range illumination. The CPU 7 instructs the driving circuit 3b to start illumination. The driving circuit 3b receiving the instruction turns on (drives) each of the plurality of light emission devices 3a.

In ACT 5, the CPU 7 confirms whether or not the offset time elapses from the moment the start timing is confirmed in ACT 3. If the offset time does not elapse, the CPU 7 repeats the processing in ACT 5. The CPU 7 waits for until the offset time elapses in ACT 5. The offset time is calculated by multiplying a predetermined reference offset time T by the variable N. The reference offset time T can be set to any value by, for example, a designer of the commodity recognition apparatus 100. In the present embodiment, the reference offset time T is set to 1/M (M is an arbitrary positive number) of the length of one exposure period of the image capturing device 2a.

In an initial stage, the variable N is 0 (zero), and thus, offset time is also 0 (zero). Therefore, the CPU 7 determines in the initial determination in ACT 5 that the offset time elapses. Then, YES is taken in ACT 5, and ACT 6 is executed.

In ACT 6, the CPU 7 starts the long-range illumination. The CPU 7 instructs the driving circuit 4b to start illumination. The driving circuit 4b receiving the instruction turns on (drives) each of the plurality of light emission devices 4a.

In ACT 7, the CPU 7 confirms whether or not the exposure of the image capturing device 2a becomes its end timing. Such a confirmation can be realized by confirming whether or not there is an ending notification from the control circuit 2b. Alternatively, the confirmation can be carried out according to a timer the operation of which is synchronized with the driving of the image capturing device 2a by the control circuit 2b. If the CPU 7 determines that it is not the end timing, NO is taken and the processing in ACT 7 is repeated. The CPU 7 waits for until it becomes the end timing in ACT 7. On the contrary, if the CPU 7 determines that it is the end timing, YES is taken and thus ACT 8 is executed.

In ACT 8, the CPU 7 stops the short-range illumination. The CPU 7 instructs the driving circuit 3b to stop the illumination. The driving circuit 3b receiving the instruction turns off each of the plurality of light emission devices 3a.

In ACT 9, the CPU 7 confirms whether or not the offset time elapses from the moment the end timing is confirmed in ACT 7. If the offset time does not elapse, the CPU 7 repeats the processing in ACT 9. The CPU 7 waits for until the offset time elapses in ACT 9.

As stated above, in the initial stage, the offset time is 0. Thus, the CPU 7 determines in the initial determination in ACT 9 that the offset time elapses. Therefore, YES is taken in ACT 9, and ACT 10 is executed.

In ACT 10, the CPU 7 stops the long-range illumination. The CPU 7 instructs the driving circuit 4b to stop the illumination. The driving circuit 4b receiving the instruction turns off each of the plurality of light emission devices 4a.

In ACT 11, the CPU 7 calculates a value representing the degree of overexposure in the image indicated by the frame data acquired just before the processing of ACT 11 is executed. No specific limitation is given to the value for evaluating the degree of overexposure. In the present embodiment, it is set to calculate the overexposure degree as the percentage of white pixels to total pixels contained in the image represented by the frame data.

In ACT 12, the CPU 7 confirms whether or not the calculated overexposure degree is equal to or greater than a predetermined first threshold value TH1. The first threshold value TH1 is set to any value by, for example, the designer of the commodity recognition apparatus 100. The first threshold value TH1 is assumed to be, for example, ⅙. If the CPU 7 determines that the overexposure degree is greater than the first threshold value TH1, YES is taken in ACT 12 and thus ACT 13 is carried out.

In ACT 13, the CPU 7 confirms whether or not the variable N is equal to or smaller than a value obtained by subtracting two from a value Nmax predetermined as the maximum value of the variable N. The maximum value Nmax is set to any value by, for example, the designer of the commodity recognition apparatus 100. In the present embodiment, the value M described above is set to the value Nmax. The maximum value Nmax is calculated by dividing the length of one exposure period of the image capturing device 2a by the reference offset time T. If the CPU 7 determines that the variable N is equal to or smaller than the value obtained by subtracting two from the maximum value Nmax, YES is taken in ACT 13 and ACT 14 is carried out.

In ACT 14, the CPU 7 increases the variable N by two. The CPU 7 increases the variable N by two only in a case where the variable N is still smaller than the maximum value Nmax even if the variable N is increased by two.

On the other hand, in ACT 12, if the CPU 7 determines that the overexposure degree is not greater than the first threshold value TH1, NO is taken and ACT 15 is executed.

In ACT 15, the CPU 7 confirms whether or not the overexposure degree is equal to or greater than a predetermined second threshold value TH2. The second threshold value TH2 is set to any value smaller than the first threshold value TH1 by, for example, the designer of the commodity recognition apparatus 100. The second threshold value TH2 is assumed to be set to, for example, ⅛. The CPU 7 confirms whether or not the overexposure degree is equal to or greater than the second threshold value TH2 and is smaller than the first threshold value TH1. If the CPU 7 determines that the overexposure degree is greater than the second threshold value TH2, YES is taken and ACT 16 is carried out. Besides, in also a case where the CPU 7 determines in ACT 13 that the variable N becomes greater than the maximum value Nmax if it is increased by two, NO is taken and thus ACT 16 is carried out.

In ACT 16, the CPU 7 confirms whether or not the variable N is smaller than a value obtained by subtracting one from the maximum value Nmax. If the CPU 7 determines that the variable N is smaller than the value obtained by subtracting one from the maximum value Nmax, YES is taken and ACT 17 is carried out.

In ACT 17, the CPU 7 increases the variable N by one. The CPU 7 increases the variable N by one only in a case where the variable N is still smaller than the maximum value Nmax even if the variable N is increased by one.

In the meantime, if the CPU 7 determines in ACT 15 that the overexposure degree is not greater than the second threshold value TH2, NO is taken and ACT 18 is carried out.

In ACT 18, the CPU 7 confirms whether or not the variable N is equal to or greater than one. If the CPU 7 determines that the variable N is greater than one, YES is taken and then ACT 19 is carried out.

In ACT 19, the CPU 7 decreases the variable N by one. The CPU 7 decreases the variable N by one only in a case where the variable N is still greater than zero even if the variable N is decreased by one.

In a case in which the CPU 7 determines in ACT 16 that the variable N becomes larger than the maximum value Nmax if it is increased by one, or in a case in which the CPU 7 determines in ACT 18 that the variable N becomes smaller than zero if it is decreased by one, NO is taken in both ACT 16 and ACT 18 and the variable N is not changed.

Through the processing in ACT 12-ACT 19 described above, in a case where the overexposure degree is greater than the threshold value TH2, the variable N is increased within such a range that the variable N is smaller than the maximum value Nmax. In addition, the increasing amount is two if the overexposure degree is greater than the threshold value TH1, and one if the overexposure degree is not greater than the threshold value TH1 (greater than the threshold value TH2 and smaller than the threshold value TH1). On the other hand, if the overexposure degree is not greater than the threshold value TH2, the variable N is decreased by one within such a range that the variable N is greater than zero.

The variable N determined in such a manner described above is used as a coefficient for determining the offset time when the processing in ACT 3-ACT 10 is executed next time. The offset time is increased compared with that in the previous exposure period before one under the condition in which overexposure occurs in the image indicated by the frame data acquired during the previous exposure period. On the contrary, the offset time is decreased compared with that in the previous exposure period described above under the condition in which the overexposure mentioned above does not occur.

In the present embodiment, the CPU 7 detects overexposure if the overexposure degree is greater than the threshold value TH2, and in this case, the CPU 7 increases the offset time to make it different from a reference value. Thus, the CPU 7 functions as the detection module and the control module for the overexposure.

The short-range illumination is generally carried out during the exposure period of the image capturing device 2a regardless of the offset time. On the contrary, the long-range illumination is carried out at the timing delayed by the offset time within the exposure period of the image capturing device 2a. But the long-range illumination is also carried out during the exposure period of the image capturing device 2a in the initial stage (reference stage) because the initial value (reference value) of the offset time is set to zero. However, the execution period of the long-range illumination is properly adjusted by the change of the offset time as stated above in response to the occurrence of overexposure.

Figure 5:
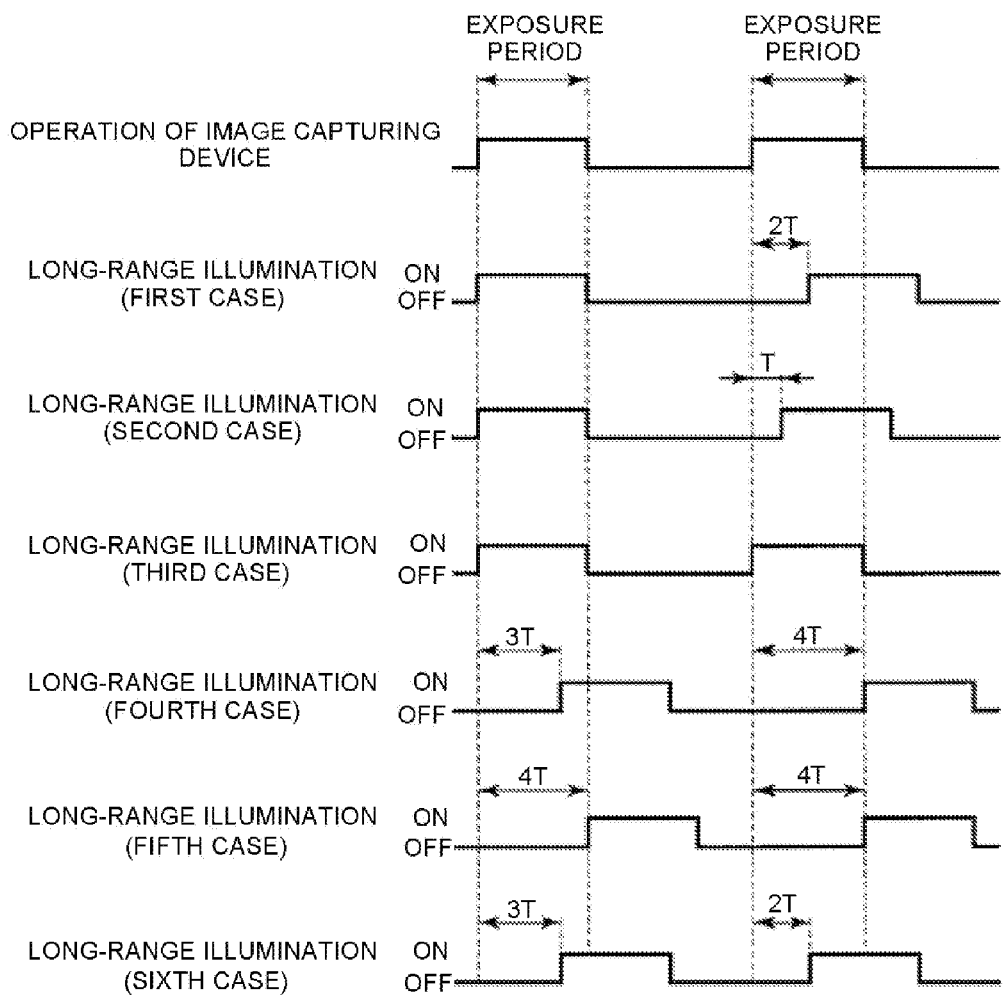
FIG. 5 is a diagram illustrating examples of variations of execution period of a long-range illumination.

FIG. 5 is a diagram illustrating examples of variations of the execution period of the long-range illumination. In FIG. 5, ¼ of the exposure period is set as a reference offset time T.

In the first case, the overexposure having the degree thereof greater than the first threshold value TH1 occurs during the exposure period in which the long-range illumination is carried out in the reference state. In this case, the execution period of the long-range illumination for the next exposure period is delayed by an offset time 2T.

In the second case, the overexposure having the degree thereof greater than the second threshold value TH2 and smaller than the first threshold value TH1 occurs during the exposure period in which the long-range illumination is carried out in the reference state. In this case, the execution period of the long-range illumination for the next exposure period is delayed by an offset time 1T.

In the third case, the overexposure degree is smaller than the second threshold value TH2 during the exposure period in which the long-range illumination is carried out in the reference state, and overexposure does not occur. In this case, the execution period of the long-range illumination for the next exposure period is not changed and thus maintained in the reference state.

In the fourth case, the overexposure having the degree thereof greater than the first threshold value TH1 occurs during the exposure period in which the offset time is set to 3T. In this case, if the offset time is further increased by 2T, the offset time becomes longer than the exposure period, thus, the offset time for the next exposure period is only increased by 1T from 3T to 4T.

In the fifth case, the overexposure having the degree thereof greater than the second threshold value TH2 occurs during the exposure period in which the offset time is set to 4T. In this case, if the offset time is increased, the offset time becomes longer than the exposure period, and thus, the offset time for the next exposure period is not changed and maintained at 4T.

In the sixth case, the overexposure degree is smaller than the second threshold value TH2 during the exposure period in which the offset time is set to 3T, and overexposure does not occur. In this case, the offset time of the long-range illumination for the next exposure period is decreased by 1T from 3T to 2T.

In the commodity recognition apparatus 100, as can be understood in FIG. 2, part of the area R2 illuminated by the first illumination unit 3 overlaps with part of the area R3 illuminated by the second illumination unit 4. Besides, the intensity of light reaching the overlapping area from the second illumination unit 4 is high because such overlapping area is closer to the second illumination unit 4 than the area to be properly illuminated by the second illumination unit 4. Therefore, if the commodity is positioned in the overlapping area and is illuminated at the same time by the light from both the first illumination unit 3 and the second illumination unit 4, an excessive illumination to the commodity may occur, and, as a result, the possibility of occurrence of overexposure to the commodity becomes high.

However, in the commodity recognition apparatus 100, the execution timing of the long-range illumination is shifted in the exposure period of the image capturing device 2a in a case where overexposure occurs. Thus, the period in which the commodity is illuminated at the same time by the light emitted from both the first illumination unit 3 and the second illumination unit 4 becomes shorter. As a result, the exposure amount to the commodity is reduced. In this way, the frequent occurrence of overexposure is reduced, which increases possibility of photographing a commodity properly.

Further, in the commodity recognition apparatus 100, the length of offset time in the execution period of the long-range illumination is changed gradually with respect to the length of the exposure period of a commodity, and thus, the offset time can be adjusted to avoid overexposure properly.

In the commodity recognition apparatus 100, the increasing amount of the length of the offset time for one time is changed according to the degree of overexposure, and thus, on the one hand, in a case in which overexposure of large amount occurs, the offset time can be adjusted to rapidly reduce the amount of overexposure, and, on the other hand, in a case in which overexposure of small amount occurs, a proper adjustment of the offset time, instead of an excessive adjustment thereof, can be carried out.

In addition, if the length of the offset time becomes the exposure period, the amount of exposure for the commodity is not increased any more even if the offset time is adjusted beyond the exposure period after that. In the commodity recognition apparatus 100, the maximum value or amount of the length of the offset time is identical to the length of the exposure period, and thus, the offset time can be changed efficiently within a valid range for adjusting the amount of exposure for the commodity.

If the length of the offset time is identical to the length of the exposure period, the long-range illumination does not substantially function to illuminate the commodity. Thus, such a case is practically equivalent to a case in which the long-range illumination is not carried out. However, if the long-range illumination is stopped in such a case, the percentage of the period in which the long-range illumination is not executed increases in the exposure period, and there may be a possibility that the operator senses flickering of the illumination. However, in the commodity recognition apparatus 100, the long-range illumination is continued even in such a case, and thus, the operator does not sense the flickering.

The present embodiment may be modified as following.

In a case of decreasing the offset time, the decreasing amount for one time may also be changed according to the overexposure amount.

If no overexposure is detected, the offset time may also be changed to the initial value at once regardless of the offset time at that moment.

At the exposure period next to the exposure period in which the occurrence of overexposure is detected, the control may also be carried out to delay the execution period of the long-range illumination for a given amount.

At a plurality of exposure periods following the exposure period in which the occurrence of overexposure is detected, the control may also be carried out to delay the execution period of the long-range illumination.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:
    an image capturing unit configured to repeatedly photograph a commodity located in an image capturing area which is illuminated for an illumination period every predetermined exposure period to capture image of the commodity;
    a recognition module configured to recognize the commodity based on the image of the commodity captured by the image capturing unit;
    a first illumination unit configured to illuminate a first illumination area closer to the image capturing unit in the image capturing area for the illumination period in relation to the exposure period;
    a second illumination unit configured to illuminate a second illumination area including at least part of the first illumination area and an area further than the first illumination area from the image capturing unit in the image capturing area for a given illumination period in relation to the exposure period;
    a detection module configured to detect occurrence of overexposure in the image captured by the image capturing unit; and
    a control module configured to control, if the detection module detects occurrence of overexposure of the image, an execution timing of illumination of the second illumination unit so that a shifting amount of the given illumination period of the second illumination unit to a successive exposure period next to the exposure period in which the overexposure is detected is different from a predetermined reference value.

2. The commodity recognition apparatus according to claim 1, wherein the control module increases the shifting amount in the successive exposure period by a first specified amount with respect to the shifting amount in the exposure period in which the occurrence of overexposure is detected by the detection module, or decreases the shifting amount in the successive exposure period by a second specified amount different from the first specified amount with respect to the shifting amount in the exposure period in which the occurrence of overexposure is not detected by the detection module.

3. The commodity recognition apparatus according to claim 2 further comprising a measurement module configured to measure the degree of overexposure, wherein the control module respectively changes the first or the second specified amount according to the degree of overexposure measured by the measurement module.

4. The commodity recognition apparatus according to claim 1, wherein the control module sets the minimum value of the shifting amount to zero, and sets the maximum value of the shifting amount to a value determined to be smaller than the length of the exposure period.

5. The commodity recognition apparatus according to claim 1, wherein the detection module detects occurrence of overexposure in a case in which the number of white pixels in the image captured by the image capturing unit is greater than a predetermined threshold value.

6. The commodity recognition apparatus according to claim 1, wherein the commodity has a code-symbol thereon for specifying the commodity and the image captured by the image capturing unit includes the code-symbol.

7. A control method of the commodity recognition apparatus having an image capturing unit, including:
    repeatedly photographing a commodity in an image capturing area which is illuminated for an illumination period by the image capturing unit every predetermined exposure period to capture image of the commodity
    recognizing the commodity based on the image of the commodity captured by the image capturing unit;
    first illuminating a first illumination area closer to the image capturing unit in the image capturing area for the illumination period in relation to the exposure period;
    second illuminating a second illumination area including at least part of the first illumination area and an area further than the first illumination area from the image capturing unit in the image capturing area for a given illumination period in relation to the exposure period;
    detecting occurrence of overexposure in the image of the commodity captured by the image capturing unit; and
    controlling, if occurrence of overexposure of the image is detected, an execution timing of the second illuminating so that a shifting amount of the given illumination period of the second illuminating to a successive exposure period next to the exposure period in which the overexposure is detected is different from a predetermined reference value.

* * * * *